W. H. CARICKHOFF.
SPRING ADJUSTMENT FOR BEDS.
APPLICATION FILED DEC. 28, 1910.
1,014,374.
Patented Jan. 9, 1912.
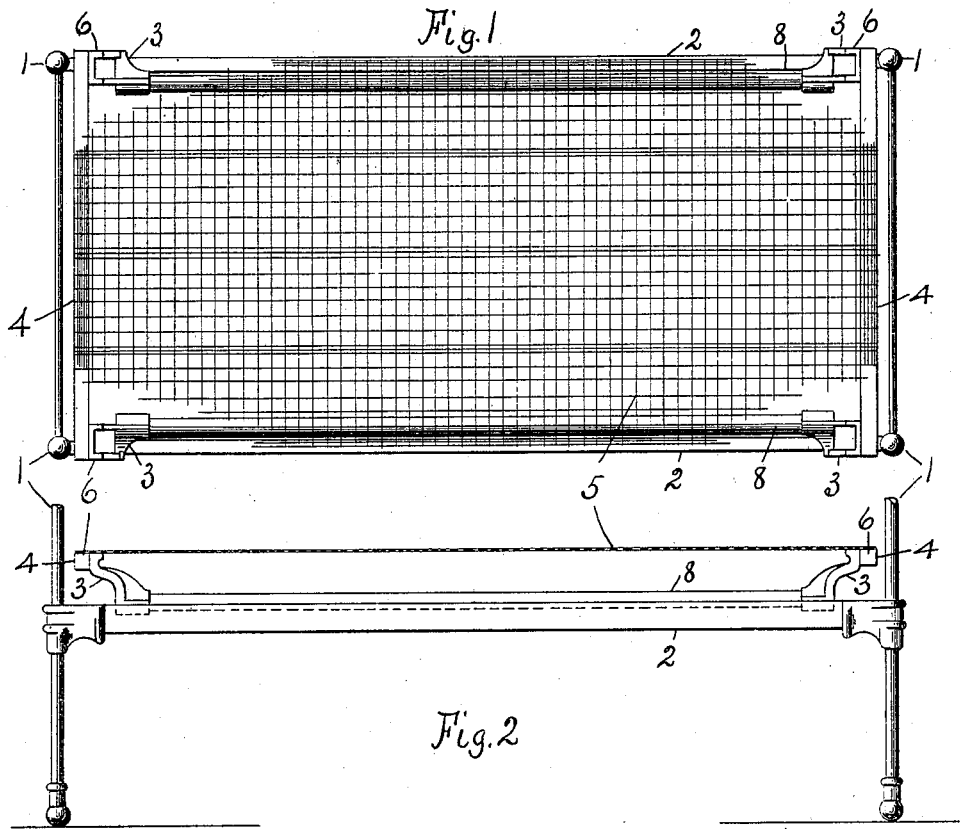
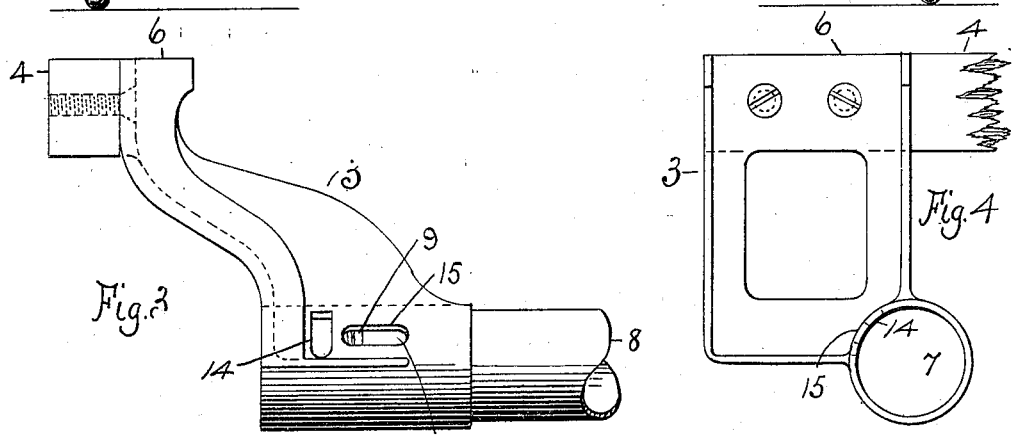
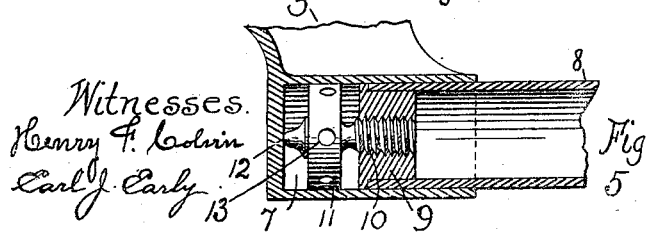
Witnesses.
Henry F. Colvin
Earl J. Early
Inventor
Wm. H. Carickhoff.
By R. C. Wright

UNITED STATES PATENT OFFICE.

WILLIAM H. CARICKHOFF, OF PHILADELPHIA, PENNSYLVANIA.

SPRING ADJUSTMENT FOR BEDS.

1,014,374.  Specification of Letters Patent.  Patented Jan. 9, 1912.

Application filed December 28, 1910. Serial No. 599,701.

*To all whom it may concern:*

Be it known that I, WILLIAM H. CARICKHOFF, a citizen of the United States, residing at Philadelphia, in the county of Philadelphia and State of Pennsylvania, have invented certain new and useful Improvements in Spring Adjustment for Beds, of which the following is a specification.

This invention relates to means for stretching bed springs to prevent their sagging, and means to observe the movement of the stretching means so that the springs may not be stretched to the breaking point, and to further insure safety the means employed will be limited, as to movement, to prevent over tension. In this arrangement the springs can be kept in condition without calling in an expert, and the springs can be adjusted to suit conditions of weight, due to heavy or light persons, or for hard or soft beds.

The invention is illustrated in the accompanying drawings wherein similar reference characters indicate similar parts throughout the views, and in which—

Figure 1 is a plan showing the application to a bedstead. Fig. 2 is an elevation, also showing its application. Fig. 3 is an outside elevation of one of the brackets. Fig. 4 is an end view of one of the brackets. Fig. 5 is a section on line $x$ $x$ Fig. 4. Fig. 6 is a view of a tool to operate the devices.

The bedstead has posts 1 which are connected by side rails 2, on which rest brackets 3 for sliding movement, the brackets being connected across by rails 4 to which the spring 5 is secured at the top 6 of the brackets. As there are no attachments of the spring to the bedstead except resting upon its rails, the spring can be readily applied to or removed from any bedstead, and are especially adapted to metal bedsteads. The brackets have pockets or receptacles 7 in which are placed the ends of the stretcher tubes 8, the tubes having one end provided with inserted nuts 9 in which are short screws 10 with heads 11 provided with bearing points 12 and holes 13 for the insertion of a turning tool, as seen in Fig. 6, or a similar device, through opening 14 on the outside of pocket 7, to manipulate screws 10 and thereby slide the brackets 3 on the rails 2 to regulate spring 5. At 15 in pockets 7 there are openings to enable the operator to see the movement of tube 8.

I have presented the best physical embodiment of my invention of which I am possessed at the present time, but necessary changes of shapes and minor constructions of details may be made which are not substantial departures from the spirit of my invention.

I claim.

1. In a spring-bed, a bracket adapted to have one end of a bed spring attached to it and having a socket formed with an opening in its side near its closed end, a stretcher having its end longitudinally slidable in said socket and having a nut in its extreme end, and a screw engaging said nut and having its other end bearing against the closed end of the socket and provided with a head constructed to be engaged and rotated by a tool inserted through the opening in the side of the socket.

2. In a spring-bed, a bracket adapted to have one end of a bed spring connected to it and having a socket formed with a longitudinal observation slot and near its closed end with a circumferential slot, a stretcher having its end longitudinally slidable in said socket and having a nut in its extreme end, and a screw threaded into said nut and formed with a head having a peripheral series of holes registering with the circumferential slot in the socket to be engaged and rotated by a tool movable in said slot and also provided with a point bearing against the closed end of the socket.

3. In a spring-bed, brackets adapted to have the ends of a bed spring connected to them and constructed to slide on the rails of a bedstead, sockets upon said brackets and formed with openings in the sides, stretchers having their ends longitudinally movable in said sockets, and screws and nuts interposed between the ends of said stretchers and the closed ends of said sockets and said screws being accessible through the openings in the sides of the sockets to be rotated.

In testimony whereof I affix my signature in presence of two witnesses.

WILLIAM H. CARICKHOFF.

Witnesses:
CHARLES E. WILLIAMS,
R. C. WRIGHT.